US012485133B2

(12) United States Patent
Fernandes et al.

(10) Patent No.: US 12,485,133 B2
(45) Date of Patent: Dec. 2, 2025

(54) INHALED IVERMECTIN

(71) Applicants: Hovione Scientia Limited, Cork (IE); Edenbridge Pharmaceuticals, LLC, Parsippany, NJ (US)

(72) Inventors: Beatriz Fernandes, Lisbon (PT); João Henriques, Lisbon (PT); Eunice Costa, Lisbon (PT); Venkatesh Naini, Parsippany, NJ (US)

(73) Assignees: Hovione Scientia Limited, Cork (IE); Edenbridge Pharmaceuticals, LLC, Parsippany, NJ (US)

( * ) Notice: Subject to any disclaimer, the term of this patent is extended or adjusted under 35 U.S.C. 154(b) by 0 days.

(21) Appl. No.: 17/592,691

(22) Filed: Feb. 4, 2022

(65) Prior Publication Data

US 2022/0241307 A1    Aug. 4, 2022

Related U.S. Application Data

(60) Provisional application No. 63/145,630, filed on Feb. 4, 2021.

(51) Int. Cl.

| *A61K 31/7048* | (2006.01) |
| *A61K 9/00* | (2006.01) |
| *A61K 47/02* | (2006.01) |
| *A61K 47/12* | (2006.01) |
| *A61K 47/18* | (2017.01) |
| *A61K 47/24* | (2006.01) |
| *A61K 47/26* | (2006.01) |

(52) U.S. Cl.
CPC ........ *A61K 31/7048* (2013.01); *A61K 9/0075* (2013.01); *A61K 47/02* (2013.01); *A61K 47/12* (2013.01); *A61K 47/183* (2013.01); *A61K 47/24* (2013.01); *A61K 47/26* (2013.01)

(58) Field of Classification Search
None
See application file for complete search history.

(56) References Cited

U.S. PATENT DOCUMENTS

| 4,853,372 | A | 8/1989 | Williams et al. |
| 5,773,422 | A | 6/1998 | Komer |
| 6,129,905 | A | 10/2000 | Cutie |
| 6,764,999 | B2 | 7/2004 | Bachman et al. |
| 7,064,108 | B2 | 6/2006 | Guzzo et al. |
| 9,238,001 | B2 | 1/2016 | Weyer et al. |
| 10,849,854 | B2 | 12/2020 | Mallard et al. |
| 2010/0222288 | A1 | 9/2010 | Freehauf |
| 2015/0265582 | A1* | 9/2015 | Armer ............... A61K 31/517 424/490 |
| 2016/0303152 | A1 | 10/2016 | Nayar |
| 2016/0303153 | A1 | 10/2016 | Nayar |
| 2021/0244705 | A1* | 8/2021 | Borody ............... A61K 31/47 |
| 2022/0143057 | A1* | 5/2022 | Farber ............... A61K 9/0019 |

FOREIGN PATENT DOCUMENTS

| AU | 2003101020 B4 | 1/2004 | |
| CN | 1174029 A * | 2/1998 | ............ A61K 9/12 |
| EP | 0179583 A1 | 4/1986 | |
| EP | 3682887 A1 | 7/2020 | |
| WO | WO-2000004906 A1 | 2/2000 | |
| WO | WO-2005016357 A1 | 2/2005 | |
| WO | WO-2015114320 A1 | 8/2015 | |
| WO | WO-2019180417 A1 | 9/2019 | |
| WO | WO-2021229514 A1 | 11/2021 | |
| WO | WO-2022034226 A1 | 2/2022 | |
| WO | WO-2022069922 A1 | 4/2022 | |

OTHER PUBLICATIONS

Heidary, F., & Gharebaghi, R. (2020). Ivermectin: a systematic review from antiviral effects to COVID-19 complementary regimen. The Journal of antibiotics, 73(9), 593-602. (Year: 2020).*

Sahakijpijarn S, Moon C, Koleng JJ, Christensen DJ, Williams RO III. Development of Remdesivir as a Dry Powder for Inhalation by Thin Film Freezing. Pharmaceutics. 2020; 12(11):1002. (Year: 2020).*

Chaccour C. et al., "Nebulized ivermectin for COVID-19 and other respiratory diseases, a proof of concept, dose-ranging study in rats," *Scientific Reports*, 2020, vol. 10, No. 1, article 17073, DOI: 10.1038/s41598-020-74084-y.

Errecalde J. et al., "Safety and Pharmacokinetic Assessments of a Novel Ivermectin Nasal Spray Formulation in a Pig Model," *Journal of Pharmaceutical Sciences*, Jan. 23, 2021, vol. 110, No. 6, pp. 2501-2507, DOI: 10.1016/j.xphs.2021.01.017.

International Search Report and Written Opinion for International Application No. PCT/US2022/015196, dated Mar. 9, 2022, 18 pages.

Ozer M et al., "Effectiveness and safety of Ivermectin in COVID-19 patients: A prospective study at a safety-net hospital," *Journal of Medical Virology*, Apr. 2022 (ePub Nov. 2021), vol. 94, No. 4, pp. 1473-1480, DOI: 10.1002/jmv.27469.

Tanta University: "Ivermectin Nasal Spray for COVID19 Patients," ClinicalTrials.gov [online], 2020, <URL: https://clinicaltrials.gov/ct2/show/NCT04510233>, [retrieved online Mar. 7, 2022].

* cited by examiner

*Primary Examiner* — Dale R Miller
(74) *Attorney, Agent, or Firm* — Dechert LLP

(57) ABSTRACT

The present invention contemplates the use of inhaled ivermectin for use in various viruses and parasitic infections (treatment and/or prophylaxis) that are present or manifest in the lungs or respiratory tract. Exemplary dosing, formulations, devices, and processing techniques are also disclosed herein.

22 Claims, No Drawings

INHALED IVERMECTIN

CROSS REFERENCE TO RELATED APPLICATIONS

This application claims the benefit of and priority to U.S. Provisional Patent Application Ser. No. 63/145,630, filed Feb. 4, 2021, the contents of which are hereby incorporated by reference.

BACKGROUND OF THE INVENTION

Ivermectin belongs to the class of macrocyclic lactones derived from the semi-synthetic analog Avermectin. Ivermectin is a mixture containing at least 90% 5-O-demethyl-22,23-dihydroavermectin $A_{1a}$ and less than 10% 5-O-demethyl-25-de(1-methylpropyl)-22,23-dihydro-25-(1-methylethyl)avermectin $A_{1a}$, generally referred to as 22,23-dihydroavermectin $B_{1a}$ and $B_{1b}$, or $H_2B_{1a}$ and $H_2B_{1b}$, respectively. The respective formulas for $H_2B_{1a}$ and $H_2B_{1b}$ are $C_{48}H_{74}O_{14}$ (molecular weight 875.10) and $C_{47}H_{72}O_{14}$ (molecular weight 861.07). Ivermectin is a white to yellowish-white non-hygroscopic crystalline powder, with a melting point of 155° C. and has 19 asymmetric centers. It is completely insoluble in water (<1 µg/mL) and non-polar aprotic solvents such as hexane but freely soluble in methanol and 95% ethanol. Ivermectin is a highly lipophilic molecule with a Log P of 4.4. In the solid state, Ivermectin is stable with no degradation observed in drug substance batches at 37° C. for 1.5 years. Because of several labile functional groups present in the molecule, Ivermectin degrades under acidic and basic aqueous conditions, with the optimal pH for stability at 6.3. Ivermectin is also prone to oxidative degradation at the 8a-methylene site.

Ivermectin is a broad spectrum antiparasitic with activity against animal and human parasites. Ivermectin was approved for animal use in 1981 and human use in 1987 for the treatment of onchocerciasis (river blindness). In 1991, it was approved for human use for the treatment of lymphatic filariasis. Ivermectin was approved by the United States Food and Drug Administration (FDA) in 1996 for the treatment of intestinal strongyloidiasis (caused by *Strongyloides stercoralis*) and onchocerciasis (caused by *Onchocerca volvulus*) and is currently available in a 3 mg tablet formulation under the brand name Stromectol (Merck) and a generic alternative (Edenbridge Pharmaceuticals).

Both oral and topical formulations of Ivermectin have been approved for human use by FDA. Ivermectin has been used as monotherapy (i.e., standalone treatment) or in combination with other drugs such as albendazole. Oral tablets, capsules, and solutions have been studied for use in several helminthic infections and as endectocide for Malaria vector control. As part of the Mectizan (Merck) donation program instituted in 1988, more than 3.7 billion doses (with annual doses at times exceeding 300 million doses) of oral Ivermectin have been dispensed for treatments of onchocerciasis and lymphatic filariasis. Other than the oral and topical formulations, no other dosage forms of Ivermectin have been approved for human use by FDA.

Inhalation drug delivery is well-established in the field of pharmaceutical science. It offers several advantages over traditional routes of drug delivery by administering the drug directly to the site of action: (1) large absorptive surface area in the lungs; (2) elevated blood flow; and (3) low metabolic activity against drugs. This route has traditionally been used to treat respiratory diseases such as asthma and chronic obstructive pulmonary disease (COPD), but more recently, other therapies have been developed utilizing the inhalation route. Three common means for delivering drug to the lungs include: (1) nebulizer; (2) metered dose inhaler (MDI); and (3) dry powder inhaler (DPI). A nebulizer atomizes a solution or suspension formulation to respirable droplets, which are inhaled by a patient via the mouth or a facemask. A MDI delivers a short burst of aerosolized drug using a propellant to deliver the drug from the device. A DPI delivers a dry powder drug using the patient's inhalation, without the use of a propellant, to deliver the drug from the device.

Several parasitic infections can spread into the lungs and respiratory tract. Exemplary parasitic infections include: (1) pulmonary strongyloidiasis caused by *Strongyloides stercoralis*; (2) pulmonary dirofilariasis caused by *Dirofilaria immitis*; (3) pulmonary acariasis caused by *Ascaris lumbricoides*; (4) toxocariasis caused by *Toxocara canis* and *Toxocara cati*; (5) dracunculiasis (Guinea Worm disease) caused by *Dracunculus medinensis*; (6) pulmonary paragoniasis caused by *Paragonimus westermani*; (7) pulmonary ancylostomiasis caused by *Ancylostoma duodenale* or *Necator americanus*; (8) pulmonary hydatid disease caused by several *Echinococcus* species such as *E. multilocularis, E. granulosus, E. vogeli*, and *E. oligarthrus*; and (9) schistosomiasis caused by several *Schistosoma* species including *S. mansoni, S. haematobium, S. japonicum, S. intercalatum*, and *S. mekongi*. Such disseminated diseases are difficult to treat with orally administered antiparasitic drugs such as ivermectin. Other available dosage forms of ivermectin are even less efficacious. If untreated, these diseases can be fatal.

Ivermectin has also been shown to be an effective antiviral against single-stranded RNA flaviviruses such as Dengue Fever, Zika, Yellow Fever, West Nile and its Australian variant Kunjin virus, Japanese encephalitis virus, Sant Louis encephalitis virus, Newcastle, Semliki Forest, Sindbis, Hendra, Venezuelan Equine Encephalitis, Chikungunya, and Avian Influenza among others. In addition, Ivermectin has shown antiviral activity against DNA viruses such as Equine Herpes Type 1, BK polyomavirus, Pseudorabies, Porcine Circovirus, and Bovine Herpes Virus among others.

A recent report has shown Ivermectin's potent in vitro activity against one of the coronaviruses—severe acute respiratory syndrome coronavirus 2 (SARS-Cov-2)—the causative agent of coronavirus disease 2019 ("COVID-19"). In that report, Ivermectin was shown to be effective in eliminating the virus from the supernatant and cells infected with SARS-Cov-2 within 48 hours when incubated with 5 µM Ivermectin. Critiques of this report focus on the concentration/dose of Ivermectin (5 µM) because the in vivo equivalent dosing via the oral route may not achieve therapeutic drug levels in lung tissue (i.e., a level required to be effective against the virus). Treatment of SARS-Cov-2, as well as other viruses that gain entry into the human body via the nasal or respiratory tract (e.g., SARS-Cov-1, Middle Eastern Respiratory Syndrome (MERS), and other human Coronaviruses such as HCoV-229E, HCoV-OC43, HCoV-NL63, and HCoV-HKU1) causing mild to severe respiratory symptoms can benefit from a dosage form that delivers Ivermectin directly to the lungs.

There is thus a need in the art for a dosage form to allow delivery of Ivermectin to the lungs. An inhaled formulation of Ivermectin can be used to treat various parasitic infections and viruses or serve as prophylaxis for such parasitic infections and viruses.

BRIEF SUMMARY OF THE INVENTION

The present invention is directed to the use of inhaled ivermectin in various viruses and parasitic infections (treatment and/or prophylaxis). As described above, inhaled Ivermectin is particularly beneficial for viruses that gain entry into the human body via the nasal or respiratory tract and parasitic infections with manifestations in the lungs and respiratory tract. Ivermectin delivered via the inhalation route is particularly beneficial for these viruses/parasitic infections because direct delivery to the lungs ensures that adequate concentration of drug is available at the site of action to achieve therapeutic effect; whereas, other forms of drug delivery (e.g., oral) may not be able to achieve such concentrations at safe levels.

Exemplary dosing, formulations, and devices for inhalation delivery to achieve therapeutic levels of Ivermectin in the respiratory tract for treatment of the above mentioned viruses and parasitic diseases are disclosed herein. Processes for making the drug product are also are presented.

One preferred embodiment of the present invention is an aqueous suspension with pharmaceutically acceptable excipients for use with commercially available nebulizers for use at home or a hospital setting. Another preferred embodiment of the present invention is a DPI formulation using either a capsule-based DPI or multi-dose device whereby the doses are contained in blisters or reservoirs within the DPI itself.

DETAILED DESCRIPTION OF THE INVENTION

The present invention is directed to the use of inhaled ivermectin in various viruses and parasitic infections (treatment and/or prophylaxis). As described above, inhaled Ivermectin is particularly beneficial for viruses that gain entry into the human body via the nasal or respiratory tract and parasitic infections with manifestations in the lungs and respiratory tract. Exemplary viruses include: (1) single-stranded RNA flaviviruses such as Dengue Fever, Zika, Yellow Fever, West Nile and its Australian variant Kunjin virus, Japanese encephalitis virus, Sant Louis encephalitis virus, Newcastle, Semliki Forest, Sindbis, Hendra, Venezuelan Equine Encephalitis, Chikungunya, and Avian Influenza; (2) DNA viruses such as Equine Herpes Type 1, BK polyomavirus, Pseudorabies, Porcine Circovirus, and Bovine Herpes Virus; and (3) coronaviruses such as SARS-Cov-1, SARS-Cov-2, Middle Eastern Respiratory Syndrome (MERS), HCoV-229E, HCoV-OC43, HCoV-NL63, and HCoV-HKU1. Exemplary parasitic infections include pulmonary strongyloidiasis, pulmonary dirofilariasis, pulmonary acariasis, toxocariasis, dracunculiasis, pulmonary ancylostomiasis, pulmonary hydatid disease, and schistosomiasis. Ivermectin delivered via the inhalation route is particularly beneficial for these viruses/parasitic infections because direct delivery to the lungs ensures that adequate concentration drug is available at the site of action to achieve therapeutic effect; whereas, other forms of drug delivery (e.g., oral) may not be able to achieve such concentrations at safe levels. Stated differently, in order to attain therapeutic concentrations via oral delivery might cause safety concerns because the dose is higher than has been approved by FDA.

Accordingly, one aspect of the invention provides a method for treating a virus in a human, the method comprising administering to the human an inhaled formulation of ivermectin. Another aspect of the invention provides a method for treating a parasitic infection in a human, the method comprising administering to the human an inhaled formulation of ivermectin. Further description of exemplary formulations of ivermectin for use in the aforementioned methods are described in more detail below.

Another aspect the invention provides a method for treating a virus, wherein the method comprises administering to a human in need thereof via inhalation a formulation of ivermectin, in order to treat the virus. Another aspect of the invention provides a method for treating a parasitic infection, wherein the method comprises administering to a human in need thereof via inhalation a formulation of ivermectin, in order to treat the parasitic infection. Further description of exemplary formulations of ivermectin for use in the aforementioned methods are described in more detail below.

Another aspect the invention provides a formulation of ivermectin for inhalation by a human comprising up to 40 mg of ivermectin per delivered dose. In certain embodiments, the formulation is for delivery to the human using a nebulizer. In certain embodiments, the formulation is for delivery to the human using a dry powder inhaler. In certain embodiments, the formulation comprises amorphous ivermectin. In certain embodiments, the formulation comprises crystalline ivermectin.

Another aspect the invention provides a formulation for inhalation delivery, the formulation comprising ivermectin. In certain embodiments, the formulation is for delivery to the human using a nebulizer. In certain embodiments, the formulation is for delivery to the human using a dry powder inhaler. In certain embodiments, the formulation comprises amorphous ivermectin. In certain embodiments, the formulation comprises crystalline ivermectin.

Another aspect of the invention provides a unit dose of a formulation of ivermectin. In certain embodiments, the unit dose provides up to 40 mg of ivermectin. In certain embodiments, the unit dose provides 40 mg of ivermectin.

The present invention contemplates the preparation of inhalable micro or nano particles of Ivermectin using traditional milling techniques such as air jet-milling, wet or dry media milling, high pressure homogenization (Gaulin APV, Microfluidizer, BEEI), spray-drying, spray-freeze drying, controlled precipitation from organic solutions, and extraction from supercritical fluids (SCF). For drug particles to reach the deep lung and be effective, aerosol particles are required to have aerodynamic diameters between 0.5 μm-5 μm. Aerodynamic diameter is defined as the diameter of a sphere with unit density that has the same terminal settling velocity as the particle in consideration. One skilled in the art of pharmaceutical formulation can determine that such aerodynamic size is determined in the laboratory using cascade impactors. The relationship between geometric and aerodynamic size can be written as:

$$D_{ae} = D_{geo} \sqrt{(r_p)/(r_o * X)}$$

Where
$D_{ae}$=Aerodynamic diameter
$D_{geo}$=Geometric diameter
$r_p$=Particle density
$r_o$=Unit density
X=Dynamic Shape factor (measures deviation from particle sphericity)

Based on above equation, particles with smaller aerodynamic size can be prepared by either decreasing the geometric size, decreasing particle density, and/or increasing the shape factor (making them more spherical).

The current invention contemplates a dose of up to 40 mg per delivered dose. A preferred embodiment comprises 10-20 mg per delivered dose, but doses as low as 0.1 mg and up to 40 mg are expressly contemplated. A therapeutic regimen may include single or multiple daily doses and may be a single day of treatment or multiple days of treatment.

A preferred dosing regimen for the prophylaxis and treatment of COVID-19 is up to 40 mg administered daily over a period of up to seven days. This same dosing may be applied for the prophylaxis and treatment of other viruses and parasitic infections described herein.

Exemplary embodiments of the present invention include nebulized formulations. Pharmaceutically acceptable excipients may be added to the formulation to aid in delivery and aerosolization. For example, in nebulized formulations, aqueous buffered saline may be used to suspend Ivermectin to match the osmolality of the lung fluid (~300 mosmol/l). Other excipients that aid in stabilizing the suspension may be used. Examples of such excipients include: (1) surfactants such as Polysorbate 80 (Tween 80), Polysorbate 20 (Tween 20), sorbitan laurate, and Poloxamer 188; (2) stabilizers such as citric acid, ascorbic acid, tartaric acid, malic acid, fumaric acid, adipic acid, methyl paraben, propyl paraben, glycerol, EDTA, N-acetyl cysteine, cysteine, ascorbyl palmitate, sodium metabisulfite, butylated hydroxyanisole (BHA), butylated hydroxytoluene (BHT), propyl gallate, thioglycerol, tocopherols, D-α-tocopherol polyethylene glycol 1000 succinate (TPGS), and calcium chloride; (3) buffering agents such as sodium citrate, monobasic and dibasic sodium phosphate, and trometamol; and (4) pH modifiers such as sodium hydroxide (NaOH) and hydrochloric acid (HCl); and (5) osmolality modifiers such as sodium chloride (NaCl) for adjusting osmolality.

Another embodiment of this invention involves the use of Ivermectin along with an antioxidant, included in the inhalation dose, which can provide additional benefits such as anti-inflammatory or immunomodulatory properties in the treatment of parasitic and viral diseases such as COVID-19. Antioxidants are beneficial in an inhaled Ivermectin formulation because (1) the antioxidants prevent the oxidation of Ivermectin, which is one of the main forms of degradation for Ivermectin thereby increasing the stability of the drug product and (2) antioxidants can have anti-inflammatory or immunomodulatory properties. Antioxidants achieve their anti-inflammatory and immunomodulatory effect by mopping up free radicals that could cause mitochondrial damage and possibly improving hematocrit by reducing the oxidative stress on cells. The combination of Ivermectin with an antioxidant leads to an unexpected synergy in efficacy likely because, Ivermectin can provide also anti-inflammatory effects by suppressing inflammatory cytokines. Exemplary antioxidants to use in the present invention include N-acetyl cysteine (NAC), thymol, menthol, tocopherols, ascorbic acid, glutathione, vitamin A, α-lipoic acid, quercetin, melatonin, vitamin D, zinc, epicatechin, propyl gallate, protocatechuic acid, gallic acid, hesperidin, and coenzyme $Q_{10}$ ($CoQ_{10}$). Antioxidants can be used in an amount from 0.1%-30% w/w of the inhaled formulation, with more preferred concentration in the range of 0.4%-10%.

Any commercially available nebulizer may be used to deliver the nebulized formulations described herein. Exemplary nebulizers include Sidestream (Philips Respironics), Ventstream (Philips Respironics), LC-Plus (PARI), LC-Sprint (PARI), Aeroneb Pro (Aerogen), and Pulmo-Aide (DeVilbiss).

Exemplary embodiments of the present invention include DPI formulations. For DPI formulations, the powder formulation is optimized in combination with the intended DPI device to achieve the maximum possible Fine Particle Fraction (FPF) of the delivered dose. FPF is defined as the fraction of particles collected on cascade impactor stages representing <5 μm aerodynamic diameter (preferably <3 μm). This in vitro parameter is a direct indicator of in vivo drug levels reaching the deep lung.

To manufacture a powder formulation of the instant invention, milled or spray dried Ivermectin particles in the size range of 0.5 μm-5 μm can optionally (i.e., excipients are not required) be dry blended with carrier excipients using low intensity mixers such as V-blender or high intensity mixers such as Turbula (Glen Mills) or Collette-Gral (Niro GEA). Milled or micronized Ivermectin particles may be further processed or conditioned by exposure to higher relative humidity, higher temperatures, and/or organic vapors to reduce degradation in the powder upon storage. Stabilized micronized Ivermectin can be further processed for use in inhalers. Exemplary carrier excipients include sugars or sugar alcohols such as lactose, glucose, mannitol, maltose, galactose, sucrose, trehalose, maltodextrins, dextrans, sorbitol, maltitol, and xylitol. Other pharmaceutically acceptable excipients may be included to reduce adhesion of drug particles to carrier surfaces (e.g., fine milled lactose—Respitose ML006 (DMV-Fonterra), micronized fine particle lactose—Lactohale300 (Domo), micronized mannitol, Poloxamer 188 (Pluronic F68), Poloxamer 407 (Pluronic F127), glyceryl monostearate, glyceryl behenate, tripalmitin, polyethylene glycol 6000, magnesium stearate, soy lecithin, PEG-40 hydrogenated castor oil (Cremophor RH-40), lysine, and leucine) and glidants (e.g., hydrophobic silicon dioxide (Aerosil 972)) to aid in flowability and filling of capsules, blisters, or DPI devices themselves. The Ivermectin may be added by itself (i.e., no excipients) or with excipients into capsules for the DPI or blisters/reservoirs for the DPI. Embodiments of DPI formulations in this present invention include concentrations ranging from 5-100% (no carrier) dispersed in excipient mixtures, with the preferred range of 50-100%.

Any commercially available DPI inhaler may be used to deliver the DPI formulations described herein. Exemplary DPI inhalers include: (1) capsule-based devices (e.g. RS00, RS01, and RX01X (Plastiape/Berry Global), PowdAir (H&T Presspart/Hovione), Novolizer (Viatris GmbH/Meda), MRX003 (Merxin), and Twister (Aptar Pharma)); or (2) multiple-dose devices based on (a) blisters (e.g., MRX001 (Merxin) and Papillion (Hovione)) or (b) powder reservoirs (e.g., Berryhaler (Plastiape/Berry Global), Twin-Caps (Hovione), 8Dose (Hovione), and Papillion (Hovione)).

To produce spray dried inhalable particles, the drug Ivermectin, with or without optional excipients, is either dissolved or suspended in hydro-organic solvent mixtures and spray dried using commercially available equipment (Buchi, Niro GEA Mobile Minor), to produce uniform particles suitable for loading into DPI devices. For clarity, the present invention does not require the use of excipients.

Typically, spray drying drug substances from solutions results in amorphous particles, and spray drying drug substances from suspensions results in crystalline particles. The present disclosure contemplates spray drying a solution of ivermectin, alone or with excipients, to create amorphous particles (i.e., a formulation with up to 100% amorphous particles). The present disclosure also contemplates spray during a suspension of ivermectin, alone or with excipients, to create crystalline particles (i.e., a formulation with up to 100% crystalline particles). Lastly, the present disclosure contemplates a mixture of amorphous particles and crystalline particles, alone or with excipients, which can be produced by spray during a combination of a solution and a suspension. Amorphous Ivermectin particles dissolve more rapidly in the lung fluids than crystalline particles. In one embodiment of the present invention, a mixture of amorphous and crystalline Ivermectin particles is created by adjusting the spray drying processing conditions. A preferred mixture contains 50:50 of amorphous:crystalline particles (i.e., 50% amorphous particles and 50% crystalline particles), but a ratio as high as 99:1 amorphous:crystalline and as low as 1:99 amorphous:crystalline is expressly contemplated herein. The mixture of amorphous and crystalline Ivermectin particles gives the surprising ability to modulate drug dissolution in lung fluids and provide a sustained action against disease pathogens. Optional excipients to aid in the dissolution of Ivermectin include Polysorbate 80 (Tween 80), Polysorbate 20 (Tween 20), Poloxamer 188, Poloxamer 407, polyvinyl pyrrolidone (PVP), β-cyclodextrin, hydroxypropyl β-cyclodextrin, γ-cyclodextrin, sulfobutylether β-cyclodextrin, and phospholipids endogenous to the lung such as phosphatidylcholine (PC), distearoyl phosphatidylcholine (DSPC), and dipalmitoyl phosphatidylcholine (DPPC). Other optional excipients include stabilizers that aid in the processing and stabilization of spray dried Ivermectin particles such as citric acid, ascorbic acid, sodium citrate, lactose, glucose, mannitol, sucrose, trehalose, galactose, maltose, dextran, calcium chloride, glycine, trileucine, leucine, tartaric acid, malic acid, fumaric acid, adipic acid, methyl paraben, propyl paraben, glycerol, EDTA, N-acetyl cysteine, cysteine, ascorbyl palmitate, sodium metabisulfite, butylated hydroxyanisole (BHA), butylated hydroxytoluene (BHT), propyl gallate, thioglycerol, D-α-tocopherol polyethylene glycol 1000 succinate (TPGS), and tocopherols. The spray-dried Ivermectin, alone or with excipients, may be filled into capsules, blisters, or DPI reservoirs. In preparation for filling into capsules, blisters, or DPI reservoirs, the spray-dried Ivermectin may be blended with fillers such as lactose, glucose, mannitol, maltose, galactose, sucrose, trehalose, maltodextrins, dextrans, sorbitol, maltitol, and xylitol.

Lastly, liposomal and mixed micelle formulations may be used to practice the instant invention. The liposomes and mixed micelles may be produced using any known method in the art.

Additional Exemplary Features of the Therapeutic Methods

General considerations that may be applied to therapeutic methods described herein are provided below and include, for example, the virus being treated, ivermectin dosing regimen, and characteristics of the inhaled formulation. A more thorough description of such features is provided below. The invention embraces all permutations and combinations of these features.

The methods may be further characterized according to the virus being treated. For example, in certain embodiments, the virus is selected from the group consisting of SARS-Cov-1, SARS-Cov-2, MERS, HCoV-229E, HCoV-OC43, HCoV-NL63, and HCoV-HKU1. In certain embodiments, the virus is SARS-CoV-2. In certain embodiments, the virus is a variant of SARS-CoV-2. In certain embodiments, the virus is a SARS-CoV-2 or a variant thereof selected from B.1.617.2, B.1.351, Cluster 5, Lineage B.1.1.207, Lineage B.1.1.7, Variant of Concern 202102/02, Lineage B.1.1.317, Lineage B.1.1.318, Lineage B.1.351, Lineage B.1.429, Lineage B.1.525, Lineage P.1, D614G, E484K, N501Y, S477G/N, and P681H.

The methods may be further characterized according to the ivermectin dosing regimen, such as the amount of ivermectin received by the human per day and the number of days when the human receives the ivermectin. For example, in certain embodiments, the human receives up to 40 mg of ivermectin daily. In certain embodiments, the human receives from 10 mg to 40 mg of ivermectin daily. In certain embodiments, the human receives from 20 mg to 40 mg of ivermectin daily. In certain embodiments, the human receives from 30 mg to 40 mg of ivermectin daily. In certain embodiments, the human receives from 10 mg to 15 mg, from 15 mg to 20 mg, from 20 mg to 25 mg, from 25 mg to 30 mg, from 30 mg to 35 mg, or from 35 mg to 40 mg of ivermectin daily. In certain embodiments, the human receives at least 10 mg, 15 mg, 20 mg, 22 mg, 25 mg, 27 mg, 30 mg, 32 mg, 35 mg, 37 mg, or 40 mg of ivermectin daily.

In certain embodiments, the human receives the inhaled formulation of ivermectin daily for at least five consecutive days. In certain embodiments, the human receives the inhaled formulation of ivermectin daily for at least six consecutive days. In certain embodiments, the human receives the inhaled formulation of ivermectin daily for at least seven consecutive days.

In certain embodiments, the human receives up to 40 mg daily over a period of up to seven days.

The methods may be further characterized according to components of the inhaled formulation. For example, in certain embodiments, the inhaled formulation of ivermectin comprises:
a. ivermectin, and
b. a surfactant.

In certain embodiments, the surfactant is a polysorbate. In certain embodiments, the surfactant is polysorbate 80. In certain embodiments, the surfactant is present in the inhaled formulation in an amount of from about 0.01% w/v to about 0.1% w/v. In certain embodiments, the surfactant is present in the inhaled formulation in an amount of from about 0.5% w/w to about 5.0% w/w. In certain embodiments, the inhaled formulation further comprises a phosphatidylcholine compound.

In certain embodiments, the inhaled formulation of ivermectin comprises:
a. ivermectin, and
b. a phosphatidylcholine compound.

In certain embodiments, the phosphatidylcholine compound is phosphatidylcholine or distearoyl phosphatidylcholine. In certain embodiments, the phosphatidylcholine compound is phosphatidylcholine. In certain embodiments, the phosphatidylcholine compound is distearoyl phosphatidylcholine. In certain embodiments, the phosphatidylcholine compound is present in the inhaled formulation in an amount of from about 3.0% w/v to about 10.0% w/v. In certain embodiments, the phosphatidylcholine compound is present in the inhaled formulation in an amount of from about 4.0% w/v to about 6.0% w/v. In certain embodiments, the phosphatidylcholine compound is present in the inhaled formulation in an amount of about 5.0% w/v. In certain embodiments, the phosphatidylcholine compound is present in the inhaled formulation in an amount of from about 10.0% w/w to about 30.0% w/w. In certain embodiments, the phosphatidylcholine compound is present in the inhaled formulation in an amount of about 25.0% w/w.

In certain embodiments, the inhaled formulation further comprises a tonicity modifier. In certain embodiments, the tonicity modifier is sodium chloride or calcium chloride.

In certain embodiments, the inhaled formulation further comprises a buffer. In certain embodiments, the buffer comprises citric acid, or a pharmaceutically acceptable salt thereof.

In certain embodiments, the inhaled formulation further comprises water.

In certain embodiments, the inhaled formulation of ivermectin comprises:
a. ivermectin, and
b. a saccharide.

In certain embodiments, the saccharide is lactose, lactose for inhalation, micronized lactose, mannitol, or mixtures of the foregoing. In certain embodiments, the saccharide is lactose, lactose for inhalation, micronized lactose, or mixtures of the foregoing. In certain embodiments, the saccharide is lactose. In certain embodiments, the saccharide is lactose for inhalation. In certain embodiments, the saccharide is micronized lactose. In certain embodiments, the saccharide is mannitol. In certain embodiments, the saccharide is present in the inhaled formulation in an amount of from about 40% w/w to about 60% w/w. In certain embodiments, the saccharide is present in the inhaled formulation in an amount of about 50% w/w.

In certain embodiments, the inhaled formulation of ivermectin comprises:
a. ivermectin, and
b. an amino acid.

In certain embodiments, the amino acid is N-acetyl cysteine, L-leucine, pharmaceutically acceptable salts thereof, and mixtures of the foregoing. In certain embodiments, the amino acid is N-acetyl cysteine or L-leucine. In certain embodiments, the amino acid is N-acetyl cysteine and L-leucine. In certain embodiments, the amino acid is present in the inhaled formulation in an amount of from about 10% w/w to about 50% w/w. In certain embodiments, the amino acid is present in the inhaled formulation in an amount of from about 20% w/w to about 40% w/w. In certain embodiments, the amino acid is present in the inhaled formulation in an amount of about 25% w/w.

In certain embodiments, the inhaled formulation of ivermectin is a formulation in the following table:

| No. | Formulation |
|---|---|
| 1 | A formulation comprising ivermectin, polysorbate 80, sodium chloride, and water |
| 2 | A formulation comprising ivermectin, polysorbate 80, sodium chloride, sodium citrate, citric acid, EDTA, and water |
| 3 | A formulation comprising ivermectin and lactose for inhalation |
| 4 | A formulation comprising amorphous ivermectin, crystalline ivermectin, and lactose for inhalation |
| 5 | A formulation comprising ivermectin and lactose for inhalation, and micronized lactose |
| 6 | A formulation comprising ivermectin, mannitol, and magnesium stearate |
| 7 | A formulation comprising ivermectin and polysorbate 80. |
| 8 | A formulation comprising ivermectin, distearoyl phosphatidylcholine, polysorbate 80, calcium chloride, and citric acid |
| 9 | A formulation comprising ivermectin, distearoyl phosphatidylcholine, calcium chloride, citric acid, and lactose monohydrate |
| 10 | A formulation comprising ivermectin, N-acetyl cysteine, and L-leucine |
| 11 | A formulation comprising Ivermectin, phosphatidylcholine, and cholesterol. |

In certain embodiments, the ivermectin in the inhaled formulation is micronized. In certain embodiments, the ivermectin in the inhaled formulation is in the form of microparticles or nanoparticles. In certain embodiments, the microparticles or nanoparticles were prepared using air jet-milling, wet or dry media milling, high pressure homogenization, spray-drying, spray-freeze drying, controlled precipitation from an organic solutions or extraction from a supercritical fluid (SCF).

In certain embodiments, at least 60% w/w of the ivermectin in the inhaled formulation has a diameter in the range of from about 0.5 μm to about 5 μm. In certain embodiments, at least 70% w/w of the ivermectin in the inhaled formulation has a diameter in the range of from about 0.5 μm to about 5 μm. In certain embodiments, at least 80% w/w of the ivermectin in the inhaled formulation has a diameter in the range of from about 0.5 μm to about 5 μm. In certain embodiments, at least 90% w/w of the ivermectin in the inhaled formulation has a diameter in the range of from about 0.5 μm to about 5 μm. In certain embodiments, at least 98% w/w of the ivermectin in the inhaled formulation has a diameter in the range of from about 0.5 μm to about 5 μm.

In certain embodiments, at least 60% w/w of the ivermectin in the inhaled formulation has a diameter in the range of from about 0.5 μm to about 2 μm, about 2 μm to about 3.5 μm, or about 3.5 to about 5 μm. In certain embodiments, at least 70% w/w of the ivermectin in the inhaled formulation has a diameter in the range of from about 0.5 μm to about 2 μm, about 2 μm to about 3.5 μm, or about 3.5 to about 5 μm. In certain embodiments, at least 80% w/w of the ivermectin in the inhaled formulation has a diameter in the range of from about 0.5 μm to about 2 μm, about 2 μm to about 3.5 μm, or about 3.5 to about 5 μm. In certain embodiments, at least 90% w/w of the ivermectin in the inhaled formulation has a diameter in the range of from about 0.5 μm to about 2 μm, about 2 μm to about 3.5 μm, or about 3.5 to about 5 μm. In certain embodiments, at least 98% w/w of the ivermectin in the inhaled formulation has a diameter in the range of from about 0.5 μm to about 2 μm, about 2 μm to about 3.5 μm, or about 3.5 to about 5 μm.

In certain embodiments, the method delivers ivermectin deep into the lung.

Additional Exemplary Features of the Ivermectin Formulations

General considerations that may be applied to the ivermectin formulations described herein are provided below and include, for example, components of the formulation and the physical form of the ivermectin in the formulation. A more thorough description of such features is provided below. The invention embraces all permutations and combinations of these features.

The formulations may be further characterized according to the components of the formulation. For example, in certain embodiments, the formulation comprises:
a. ivermectin, and
b. a surfactant.

In certain embodiments, the surfactant is a polysorbate. In certain embodiments, the surfactant is polysorbate 80. In certain embodiments, the surfactant is present in the inhaled formulation in an amount of from about 0.01% w/v to about 0.1% w/v. In certain embodiments, the surfactant is present in the formulation in an amount of from about 0.5% w/w to about 5.0% w/w. In certain embodiments, the formulation further comprises a phosphatidylcholine compound.

In certain embodiments, the formulation comprises:
a. ivermectin, and
b. a phosphatidylcholine compound.

In certain embodiments, the phosphatidylcholine compound is phosphatidylcholine or distearoyl phosphatidylcholine. In certain embodiments, the phosphatidylcholine compound is phosphatidylcholine. In certain embodiments, the phosphatidylcholine compound is distearoyl phosphatidylcholine. In certain embodiments, the phosphatidylcholine compound is present in the inhaled formulation in an amount of from about 3.0% w/v to about 10.0% w/v. In certain embodiments, the phosphatidylcholine compound is present in the formulation in an amount of from about 4.0% w/v to about 6.0% w/v. In certain embodiments, the phosphatidylcholine compound is present in the formulation in an amount of about 5.0% w/v. In certain embodiments, the phosphatidylcholine compound is present in the formulation in an amount of from about 10.0% w/w to about 30.0% w/w. In certain embodiments, the phosphatidylcholine compound is present in the formulation in an amount of about 25.0% w/w.

In certain embodiments, the formulation further comprises a tonicity modifier. In certain embodiments, the tonicity modifier is sodium chloride or calcium chloride.

In certain embodiments, the formulation further comprises a buffer. In certain embodiments, the buffer comprises citric acid, or a pharmaceutically acceptable salt thereof.

In certain embodiments, the formulation further comprises water.

In certain embodiments, the formulation comprises:
a. ivermectin, and
b. a saccharide.

In certain embodiments, the saccharide is lactose, lactose for inhalation, micronized lactose, mannitol, or mixtures of the foregoing. In certain embodiments, the saccharide is lactose, lactose for inhalation, micronized lactose, or mixtures of the foregoing. In certain embodiments, the saccharide is lactose. In certain embodiments, the saccharide is lactose for inhalation. In certain embodiments, the saccharide is micronized lactose. In certain embodiments, the saccharide is mannitol. In certain embodiments, the saccharide is present in the formulation in an amount of from about 40% w/w to about 60% w/w. In certain embodiments, the saccharide is present in the formulation in an amount of about 50% w/w.

In certain embodiments, the formulation comprises:
a. ivermectin, and
b. an amino acid.

In certain embodiments, the amino acid is N-acetyl cysteine, L-leucine, pharmaceutically acceptable salts thereof, and mixtures of the foregoing. In certain embodiments, the amino acid is N-acetyl cysteine or L-leucine. In certain embodiments, the amino acid is N-acetyl cysteine and L-leucine. In certain embodiments, the amino acid is present in the formulation in an amount of from about 10% w/w to about 50% w/w. In certain embodiments, the amino acid is present in the formulation in an amount of from about 20% w/w to about 40% w/w. In certain embodiments, the amino acid is present in the formulation in an amount of about 25% w/w.

In certain embodiments, the formulation is a formulation in the following table:

| No. | Formulation |
| --- | --- |
| 1 | A formulation comprising ivermectin, polysorbate 80, sodium chloride, and water |
| 2 | A formulation comprising ivermectin, polysorbate 80, sodium chloride, sodium citrate, citric acid, EDTA, and water |
| 3 | A formulation comprising ivermectin and lactose for inhalation |
| 4 | A formulation comprising amorphous ivermectin, crystalline ivermectin, and lactose for inhalation |
| 5 | A formulation comprising ivermectin and lactose for inhalation, and micronized lactose |
| 6 | A formulation comprising ivermectin, mannitol, and magnesium stearate |
| 7 | A formulation comprising ivermectin and polysorbate 80. |
| 8 | A formulation comprising ivermectin, distearoyl phosphatidylcholine, polysorbate 80, calcium chloride, and citric acid |
| 9 | A formulation comprising ivermectin, distearoyl phosphatidylcholine, calcium chloride, citric acid, and lactose monohydrate |
| 10 | A formulation comprising ivermectin, N-acetyl cysteine, and L-leucine |
| 11 | A formulation comprising ivermectin, phosphatidylcholine, and cholesterol. |

The formulations may be further characterized according to the physical form of the ivermectin in the formulation. For example, in certain embodiments, the ivermectin in the formulation is micronized. In certain embodiments, the ivermectin in the formulation is in the form of microparticles or nanoparticles. In certain embodiments, the microparticles or nanoparticles were prepared using air jet-milling, wet or dry media milling, high pressure homogenization, spray-drying, spray-freeze drying, controlled precipitation from an organic solutions or extraction from a supercritical fluid (SCF).

In certain embodiments, at least 60% w/w of the ivermectin in the formulation has a diameter in the range of from about 0.5 µm to about 5 µm. In certain embodiments, at least 70% w/w of the ivermectin in the formulation has a diameter in the range of from about 0.5 µm to about 5 µm. In certain embodiments, at least 80% w/w of the ivermectin in the formulation has a diameter in the range of from about 0.5 µm to about 5 µm. In certain embodiments, at least 90% w/w of the ivermectin in the formulation has a diameter in the range of from about 0.5 µm to about 5 µm. In certain embodiments, at least 98% w/w of the ivermectin in the formulation has a diameter in the range of from about 0.5 µm to about 5 µm.

In certain embodiments, at least 60% w/w of the ivermectin in the inhaled formulation has a diameter in the range of from about 0.5 µm to about 2 µm, about 2 µm to about 3.5 µm, or about 3.5 to about 5 µm. In certain embodiments, at least 70% w/w of the ivermectin in the inhaled formulation has a diameter in the range of from about 0.5 µm to about 2 µm, about 2 µm to about 3.5 µm, or about 3.5 to about 5 µm. In certain embodiments, at least 80% w/w of the ivermectin in the inhaled formulation has a diameter in the range of from about 0.5 µm to about 2 µm, about 2 µm to about 3.5 µm, or about 3.5 to about 5 µm. In certain embodiments, at least 90% w/w of the ivermectin in the inhaled formulation has a diameter in the range of from about 0.5 µm to about 2 µm, about 2 µm to about 3.5 µm, or about 3.5 to about 5 µm. In certain embodiments, at least 98% w/w of the ivermectin in the inhaled formulation has a diameter in the range of from about 0.5 µm to about 2 µm, about 2 µm to about 3.5 µm, or about 3.5 to about 5 µm.

Throughout the description above, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

The following examples are provided to help understand the invention but are not intended to limit the scope of the invention.

Example 1

The formulation and process for one exemplary embodiment of a nebulized suspension formulation of Ivermectin are described below.

| Ingredient | Composition |
| --- | --- |
| Micronized Ivermectin | 0.25 mg |
| Polysorbate 80 (Tween 80) | 0.20 mg |

-continued

| Ingredient | Composition |
| --- | --- |
| Sodium Chloride | 9.0 mg |
| Water for Injection | q.s. to 1.0 mL |

The surfactant and sodium chloride are dissolved in water for injection. The micronized drug is slowly added to the solution and homogenized using a rotor-stator homogenizer (L5M-A, Silverson). The suspension is filled under sterile conditions into blow fill seal ampules. When tested using a cascade impactor with a commercially available jet nebulizer such as the PARI LC Plus (PARI), it has a target FPF between 10-20%.

Example 2

The formulation and process for one exemplary embodiment of a nebulized suspension formulation of Ivermectin are described below.

| Ingredient | Composition |
| --- | --- |
| Micronized Ivermectin | 1.0 mg |
| Polysorbate 80 (Tween 80) | 0.80 mg |
| Sodium Chloride | 9.0 mg |
| Water for Injection | q.s. to 1.0 mL |

The surfactant and sodium chloride are dissolved in water for injection. The micronized drug is slowly added to the solution and homogenized using a rotor-stator homogenizer (L5M-A, Silverson). The suspension is filled under sterile conditions into blow fill seal ampules. When tested using a cascade impactor with a commercially available jet nebulizer such as the PARI LC Plus (PARI), it has a target FPF between 10-20%.

Example 3

The formulation and process for one exemplary embodiment of a nebulized suspension formulation of Ivermectin are described below.

| Ingredient | % w/v |
| --- | --- |
| Micronized Ivermectin | 1.00 |
| Polysorbate 80 (Tween 80) | 0.04 |
| Sodium Chloride | 0.90 |
| Sodium Citrate, Dihydrate | 0.10 |
| Citric Acid | 0.06 |
| EDTA | 0.01 |
| Water for Injection | q.s. |

Polysorbate 80, sodium chloride, sodium citrate, citric acid, and EDTA are dissolved in water for injection. Micronized ivermectin is suspended in the above solution and homogenized using rotor-stator homogenizer (L5M-A, Silverson). The suspension is aseptically manufactured and filled under sterile conditions into blow fill seal ampules. When tested using a cascade impactor with a commercially available jet nebulizer such as the PARI LC Plus (PARI), it has a target FPF between 10-20%.

Example 4

The formulation and process for one exemplary embodiment of a DPI formulation of Ivermectin are described below.

| Ingredient | Mg/dose | % |
| --- | --- | --- |
| Ivermectin (Micronized or Spray Dried) | 20.0 | 100 |
| Total | 20.0 | 100 |

The micronized or spray dried Ivermectin is encapsulated (MG2, Flexalab) into hypromellose capsules (VCaps DPI, Capsugel). The capsule is loaded into a DPI device (Plastiape RS01, Berry) and tested for aerodynamic particle sizing, exhibiting a FPF greater than 50% and an emitted dose from the device greater than 80%.

Example 5

The formulation and process for one exemplary embodiment of a DPI formulation of Ivermectin are described below.

| Ingredient | Mg/dose | % |
| --- | --- | --- |
| Ivermectin (Micronized or Spray Dried) | 20.0 | 50 |
| Lactose for Inhalation (Inhalac-230, Meggle) | 20.0 | 50 |
| Total | 40.0 | 100 |

The micronized or spray dried Ivermectin is blended with lactose in a Turbula mixer or a high-shear mixer (Collette-Gral, Niro-GEA) until uniformly dispersed. The blend is discharged from the mixer and encapsulated (MG2, Flexalab) into hypromellose capsules (VCaps DPI, Capsugel). The capsule is loaded into a DPI device (Plastiape RS01, Berry) and tested for aerodynamic particle sizing, exhibiting a FPF>50% and an emitted dose from the device>80%.

Example 6

The formulation and process for one exemplary embodiment of a DPI formulation of Ivermectin are described below.

| Ingredient | Mg/dose | % |
| --- | --- | --- |
| Amorphous Ivermectin (Spray Dried) | 10.0 | 25 |
| Crystalline Ivermectin (Milled or Spray Dried) | 10.0 | 25 |
| Lactose for Inhalation (Inhalac-230, Meggle) | 20.0 | 50 |
| Total | 40.0 | 100 |

The amorphous Ivermectin particles are produced by spray-drying an ethanolic solution. The amorphous nature of the particles are verified using x-ray powder diffraction (XRPD). The crystalline Ivermectin particles can be produced by air jet-milling, wet or dry media milling, high pressure homogenization (Gaulin APV, Microfluidizer, BEEI), spray-drying, and extraction from supercritical fluids (SCF). The crystalline and amorphous Ivermectin particles are blended with lactose in a Turbula mixer or a high-shear mixer (Collette-Gral, Niro-GEA) until uniformly dispersed. The blend is discharged from the mixer and encapsulated (MG2, Flexalab) into hypromellose capsules (VCaps DPI, Capsugel). The capsule is loaded into a DPI device (Plastiape RS01, Berry) and tested for aerodynamic particle sizing, exhibiting a FPF>50% and an emitted dose from the device>80%.

Example 7

The formulation and process for one exemplary embodiment of a DPI formulation of Ivermectin are described below.

| Ingredient | mg/dose | % |
|---|---|---|
| Ivermectin (Micronized or Spray Dried) | 10.0 | 50 |
| Lactose for Inhalation (Inhalac-230, Meggle) | 5.0 | 25 |
| Micronized Lactose (Lactohale 300, Domo) | 5.0 | 25 |
| Total | 20.0 | 100 |

The micronized lactose is first blended with lactose for inhalation in a low shear mixer such as V-blender, to provide a uniform carrier surface. The micronized or spray dried Ivermectin is added to the mixture and further blended in a Turbula (Glen Mills) or high-shear mixer (Diosna or Collette-Gral) until uniformly dispersed. The blend is discharged and filled into capsules (VCaps DPI, Capsugel) using an encapsulation machine (MG2, Flexalab). The filled capsule is loaded into a DPI (Plastiape RS01, Berry) and tested for aerodynamic particle size using cascade impactor. The formulation exhibits a FPF greater than 50% and an emitted dose from the device of >80%.

Example 8

The formulation and process for one exemplary embodiment of a DPI formulation of Ivermectin are described below.

| Ingredient | mg/dose | % |
|---|---|---|
| Ivermectin (Micronized or Spray Dried) | 10.0 | 50 |
| Mannitol | 9.5 | 47.5 |
| Magnesium Stearate | 0.5 | 2.5 |
| Total | 20.0 | 100 |

The magnesium stearate is blended with mannitol in a low shear blender such as a V-blender to provide uniform coverage of the carrier particles. The micronized or spray dried Ivermectin is added to the mixture and further blended in a Turbula or high-shear mixer (Diosna or Collette-Gral) until uniformly dispersed. The blend is discharged and filled into capsules (VCaps DPI, Capsugel) using an encapsulation machine (MG2, Flexalab). The filled capsule is loaded into a DPI (Plastiape RS01, Berry) and tested for aerodynamic particle size using cascade impactor. The formulation exhibits a fine particle fraction (FPF)>50% and an emitted dose from the device of >80%.

Example 9

The formulation and process for one exemplary embodiment of a spray-dried powder for inhalation are described below.

| Ingredient | % |
|---|---|
| Ivermectin | 99.0 |
| Polysorbate 80 (Tween 80) | 1.0 |
| Total | 100.0 |

The excipients and Ivermectin drug substance, is either dissolved or dispersed in ethanol or ethanol-water mixtures to produce clear solution or colloidal dispersion. The feedstock solution solids concentrations may vary between 5-20%. The dispersions are spray-dried under mild conditions with nitrogen purging. Particles are collected in the cyclone collector of the spray dried and recovered for further processing. The powders may be further dried in an oven to reduce residual solvent content and stored under dry conditions for further processing. The dried powders are then encapsulated in hypromellose capsules (VCaps, Capsugel) using an encapsulation machine (MG2, Flexalab). The capsule with a nominal powder loading of 10-40 mg are tested with a commercially available DPI (Plastiape RS01, Berry) for aerodynamic particle size using cascade impaction. The formulation exhibits a fine particle fraction (FPF)>50% and an emitted dose from the device of >80%. The ratio of amorphous:crystalline Ivermectin in the exemplary formulations can be modulated by adjusting the feedstock solution solids concentration, ethanol:water ratio of the feedstock and spray-drying processing conditions. Ethanol and purified water are used as processing aids and are not part of the finished formulation.

Example 10

The formulation and process for one exemplary embodiment of a spray-dried powder for inhalation are described below.

| Ingredient | % |
|---|---|
| Ivermectin | 93.5 |
| Distearoyl Phosphatidylcholine (DSPC) | 4.0 |
| Polysorbate 80 (Tween 80) | 1.0 |
| Calcium Chloride | 1.0 |
| Citric Acid | 0.5 |
| Total | 100.0 |

The excipients and Ivermectin drug substance, is either dissolved or dispersed in ethanol or ethanol-water mixtures to produce clear solution or colloidal dispersion. The feedstock solution solids concentrations may vary between 5-20%. The dispersions are spray-dried under mild conditions with nitrogen purging. Particles are collected in the cyclone collector of the spray dried and recovered for further processing. The powders may be further dried in an oven to reduce residual solvent content and stored under dry conditions for further processing. The dried powders are then encapsulated in hypromellose capsules (VCaps, Capsugel) using an encapsulation machine (MG2, Flexalab). The capsule with a nominal powder loading of 10-40 mg are tested with a commercially available DPI (Plastiape RS01, Berry)

for aerodynamic particle size using cascade impaction. The formulation exhibits a fine particle fraction (FPF)>50% and an emitted dose from the device of >80%. The ratio of amorphous:crystalline Ivermectin in the exemplary formulations can be modulated by adjusting the feedstock solution solids concentration, ethanol:water ratio of the feedstock and spray-drying processing conditions. Ethanol and purified water are used as processing aids and are not part of the finished formulation.

Example 11

The formulation and process for one exemplary embodiment of a spray-dried powder for inhalation are described below.

| Ingredient | % |
|---|---|
| Ivermectin | 85.0 |
| Distearoyl Phosphatidylcholine (DSPC) | 5.0 |
| Calcium Chloride | 2.0 |
| Citric Acid | 1.0 |
| Lactose Monohydrate | 7.0 |
| Total | 100.0 |

The excipients and Ivermectin drug substance, is either dissolved or dispersed in ethanol or ethanol-water mixtures to produce clear solution or colloidal dispersion. The feedstock solution solids concentrations may vary between 5-20%. The dispersions are spray-dried under mild conditions with nitrogen purging. Particles are collected in the cyclone collector of the spray dried and recovered for further processing. The powders may be further dried in an oven to reduce residual solvent content and stored under dry conditions for further processing. The dried powders are then encapsulated in hypromellose capsules (VCaps, Capsugel) using an encapsulation machine (MG2, Flexalab). The capsule with a nominal powder loading of 10-40 mg are tested with a commercially available DPI (Plastiape RS01, Berry) for aerodynamic particle size using cascade impaction. The formulation exhibits a fine particle fraction (FPF)>50% and an emitted dose from the device of >80%. The ratio of amorphous:crystalline Ivermectin in the exemplary formulations can be modulated by adjusting the feedstock solution solids concentration, ethanol:water ratio of the feedstock and spray-drying processing conditions. Ethanol and purified water are used as processing aids and are not part of the finished formulation.

Example 12

The formulation and process for one exemplary embodiment of a spray-dried powder for inhalation are described below.

| Ingredient | % |
|---|---|
| Ivermectin | 75.0 |
| N-Acetyl Cysteine | 10.0 |
| L-Leucine | 15.0 |
| Total | 100.0 |

The excipients and Ivermectin drug substance, is either dissolved or dispersed in ethanol or ethanol-water mixtures to produce clear solution or colloidal dispersion. The feedstock solution solids concentrations may vary between 5-20%. The dispersions are spray-dried under mild conditions with nitrogen purging. Particles are collected in the cyclone collector of the spray dried and recovered for further processing. The powders may be further dried in an oven to reduce residual solvent content and stored under dry conditions for further processing. The dried powders are then encapsulated in hypromellose capsules (VCaps, Capsugel) using an encapsulation machine (MG2, Flexalab). The capsule with a nominal powder loading of 10-40 mg are tested with a commercially available DPI (Plastiape RS01, Berry) for aerodynamic particle size using cascade impaction. The formulation exhibits a fine particle fraction (FPF)>50% and an emitted dose from the device of >80%. The ratio of amorphous:crystalline Ivermectin in the exemplary formulations can be modulated by adjusting the feedstock solution solids concentration, ethanol:water ratio of the feedstock and spray-drying processing conditions. Ethanol and purified water are used as processing aids and are not part of the finished formulation.

Example 13

The formulation and process for one exemplary embodiment of a liposomal spray-dried powder for inhalation are described below.

| Ingredient | % |
|---|---|
| Ivermectin | 0.9 |
| Phosphatidylcholine (PC) | 27.0 |
| Cholesterol | 9.0 |
| Ethanol* | q.s. |
| Purified Water* | q.s. |

*Processing aids, not part of the finished formulation

Ivermectin is first dissolved in ethanol. Phosphatidylcholine and cholesterol are also dissolved in ethanol. Both solutions are then mixed by adding one into the other solution slowly under constant stirring. The resulting solution is injected using a syringe pump into double distilled water under constant stirring. The resulting liposomes are analyzed for particle size using photon correlation spectroscopy—PCS (Malvern Zetasizer) and drug encapsulation efficiency. A carrier sugar or sugar alcohol like lactose or mannitol is then added to the liposomal dispersion and further spray dried to produce the dry powder for inhalation. The dried powder can be filled into hypromellose capsule and analyzed for aerodynamic size using a commercially available DPI (RS01, Plastiape, Berry).

What is claimed is:

1. A method for treating a virus in a human comprising administering to the human an inhaled formulation of ivermectin, wherein either:
    (a) the inhaled formulation of ivermectin is an aqueous suspension consisting of ivermectin and one or more pharmaceutically acceptable excipients, wherein the inhaled formulation of ivermectin is administered to the human using a nebulizer; or
    (b) the inhaled formulation of ivermectin is a dry powder formulation consisting of (i) milled or spray-dried particles of ivermectin, (ii) optionally one or more carrier excipients, and (iii) optionally one or more excipients to reduce adhesion of drug particles to carrier surfaces, wherein the inhaled formulation of ivermectin is administered to the human using a dry powder inhaler.

2. The method of claim 1 wherein the virus is a single-stranded RNA flavivirus.

3. The method of claim 1 wherein the virus is selected from the group consisting of Dengue Fever, Zika, Yellow Fever, West Nile and its Australian variant Kunjin virus, Japanese encephalitis virus, Sant Louis encephalitis virus, Newcastle, Semliki Forest, Sindbis, Hendra, Venezuelan Equine Encephalitis, Chikungunya, and Avian Influenza.

4. The method of claim 1 wherein the virus is a DNA virus.

5. The method of claim 1 wherein the virus is selected from the group consisting of Equine Herpes Type 1, BK polyomavirus, Pseudorabies, Porcine Circovirus, and Bovine Herpes Virus.

6. The method of claim 1 wherein the virus is a coronavirus.

7. The method of claim 1 wherein the virus is selected from the group consisting of SARS-Cov-1, SARS-Cov-2, MERS, HCoV-229E, HCoV-OC43, HCoV-NL63, and HCoV-HKU1.

8. The method of claim 1 wherein the virus is SARS-CoV-2.

9. The method of claim 1 wherein the virus is a variant of SARS-CoV-2.

10. The method of claim 1 wherein the human receives up to 40 mg of ivermectin daily.

11. The method of claim 1 wherein the human receives from 10 mg to 40 mg of ivermectin daily.

12. The method of claim 1 wherein the human receives from 20 mg to 40 mg of ivermectin daily.

13. The method of claim 1 wherein the human receives from 30 mg to 40 mg of ivermectin daily.

14. The method of claim 1 wherein the human receives the inhaled formulation of ivermectin daily for at least five consecutive days.

15. The method of claim 1, wherein the inhaled formulation of ivermectin is an aqueous suspension wherein at least one of the one or more pharmaceutically acceptable excipients is a surfactant.

16. The method of claim 15, wherein the surfactant is polysorbate 80.

17. The method of claim 16, wherein at least one of the one or more pharmaceutically acceptable excipients is a phosphatidylcholine compound.

18. The method of claim 1, wherein at least one of the one or more pharmaceutically acceptable excipients or at least one of the one or more carrier excipients is a phosphatidylcholine compound.

19. The method of claim 17, wherein the phosphatidylcholine compound is phosphatidylcholine or distearoyl phosphatidylcholine.

20. The method of claim 1, wherein the inhaled formulation of ivermectin is a formulation in the following table:

| No. | Formulation |
|---|---|
| 1 | A formulation consisting of (i) ivermectin, polysorbate 80, sodium chloride, and water and (ii) optionally one or more pharmaceutically acceptable excipients |
| 2 | A formulation consisting of (i) ivermectin, polysorbate 80, sodium chloride, sodium citrate, citric acid, EDTA, and water and (ii) optionally one or more pharmaceutically acceptable excipients |
| 3 | A formulation consisting of (i) ivermectin and lactose for inhalation, (ii) optionally one or more carrier excipients, and (iii) optionally one or more excipients to reduce adhesion of drug particles to carrier surfaces; wherein the ivermectin is in the form of milled or spray-dried particles of ivermectin |
| 4 | A formulation consisting of (i) amorphous ivermectin, crystalline ivermectin, and lactose for inhalation, (ii) optionally one or more carrier excipients, and (iii) optionally one or more excipients to reduce adhesion of drug particles to carrier surfaces; wherein the ivermectin is in the form of milled or spray-dried particles of ivermectin |
| 5 | A formulation consisting of (i) ivermectin and lactose for inhalation, and micronized lactose, (ii) optionally one or more carrier excipients, and (iii) optionally one or more excipients to reduce adhesion of drug particles to carrier surfaces; wherein the ivermectin is in the form of milled or spray-dried particles of ivermectin |
| 6 | A formulation consisting of (i) ivermectin, mannitol, and magnesium stearate, (ii) optionally one or more carrier excipients, and (iii) optionally one or more excipients to reduce adhesion of drug particles to carrier surfaces; wherein the ivermectin is in the form of milled or spray-dried particles of ivermectin |
| 7 | A formulation consisting of (i) ivermectin and polysorbate 80, (ii) optionally one or more carrier excipients, and (iii) optionally one or more excipients to reduce adhesion of drug particles to carrier surfaces; wherein the ivermectin is in the form of milled or spray-dried particles of ivermectin |
| 8 | A formulation consisting of (i) ivermectin, distearoylphosphatidylcholine, polysorbate 80, calcium chloride, and citric acid, (ii) optionally one or more carrier excipients, and (iii) optionally one or more excipients to reduce adhesion of drug particles to carrier surfaces; wherein the ivermectin is in the form of milled or spray-dried particles of ivermectin |
| 9 | A formulation consisting of (i) ivermectin, distearoylphosphatidylcholine, calcium chloride, citric acid, and lactose monohydrate, (ii) optionally one or more carrier excipients, and (iii) optionally one or more excipients to reduce adhesion of drug particles to carrier surfaces; wherein the ivermectin is in the form of milled or spray-dried particles of ivermectin |
| 10 | A formulation consisting of (i) ivermectin, N-acetylcysteine, and L-leucine, (ii) optionally one or more carrier excipients, and (iii) optionally one or more excipients to reduce adhesion of drug particles to carrier surfaces; wherein the ivermectin is in the form of milled or spray-dried particles of ivermectin |
| 11 | A formulation consisting of (i) ivermectin, phosphatidylcholine, and cholesterol, (ii) optionally one or more carrier excipients, and (iii) optionally one or more excipients to reduce adhesion of drug particles to carrier surfaces; wherein the ivermectin is in the form of milled or spray-dried particles of ivermectin. |

21. The method of claim 1, wherein the ivermectin in the inhaled formulation is micronized.

22. The method of claim 1 wherein the inhaled formulation of ivermectin is an aqueous suspension consisting of ivermectin and one or more pharmaceutically acceptable excipients, wherein the inhaled formulation of ivermectin is administered to the human using a nebulizer.

* * * * *